Patented Feb. 16, 1954

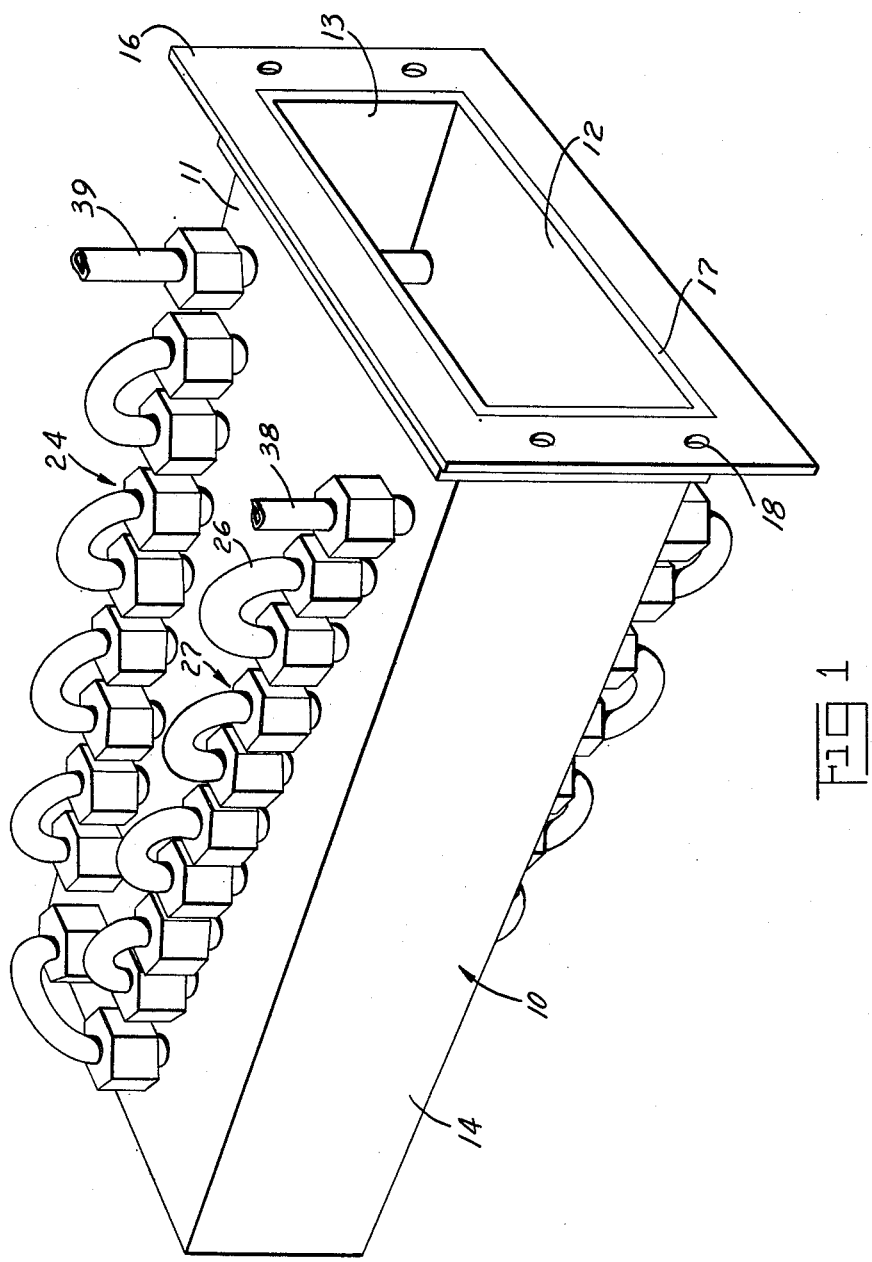

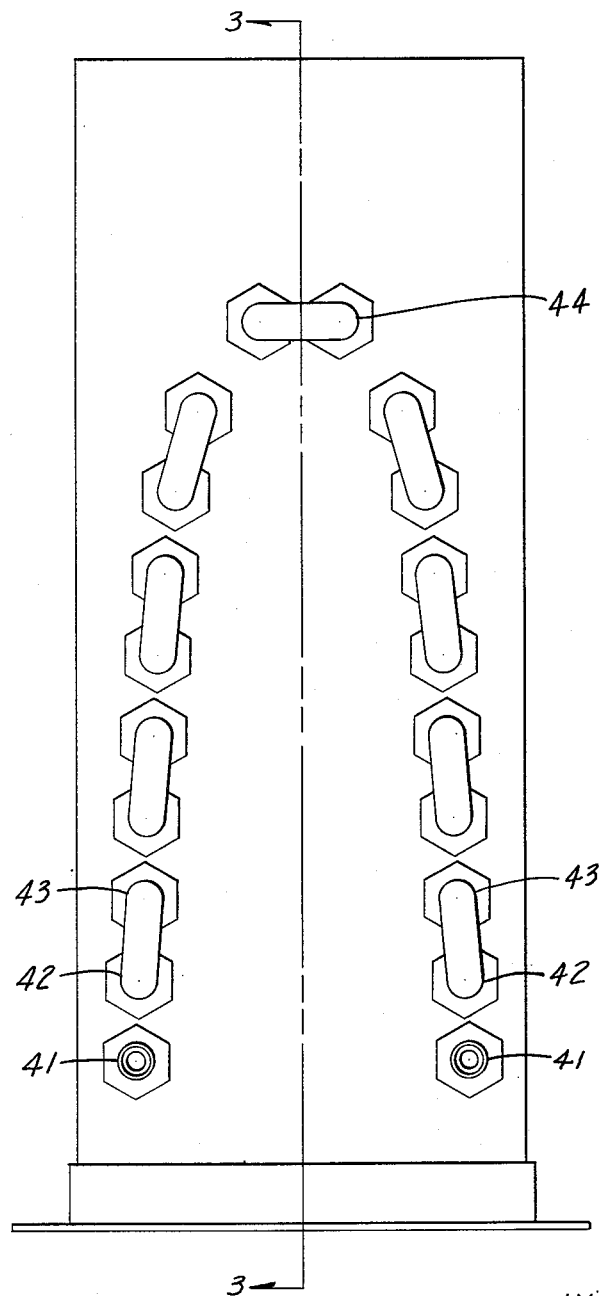

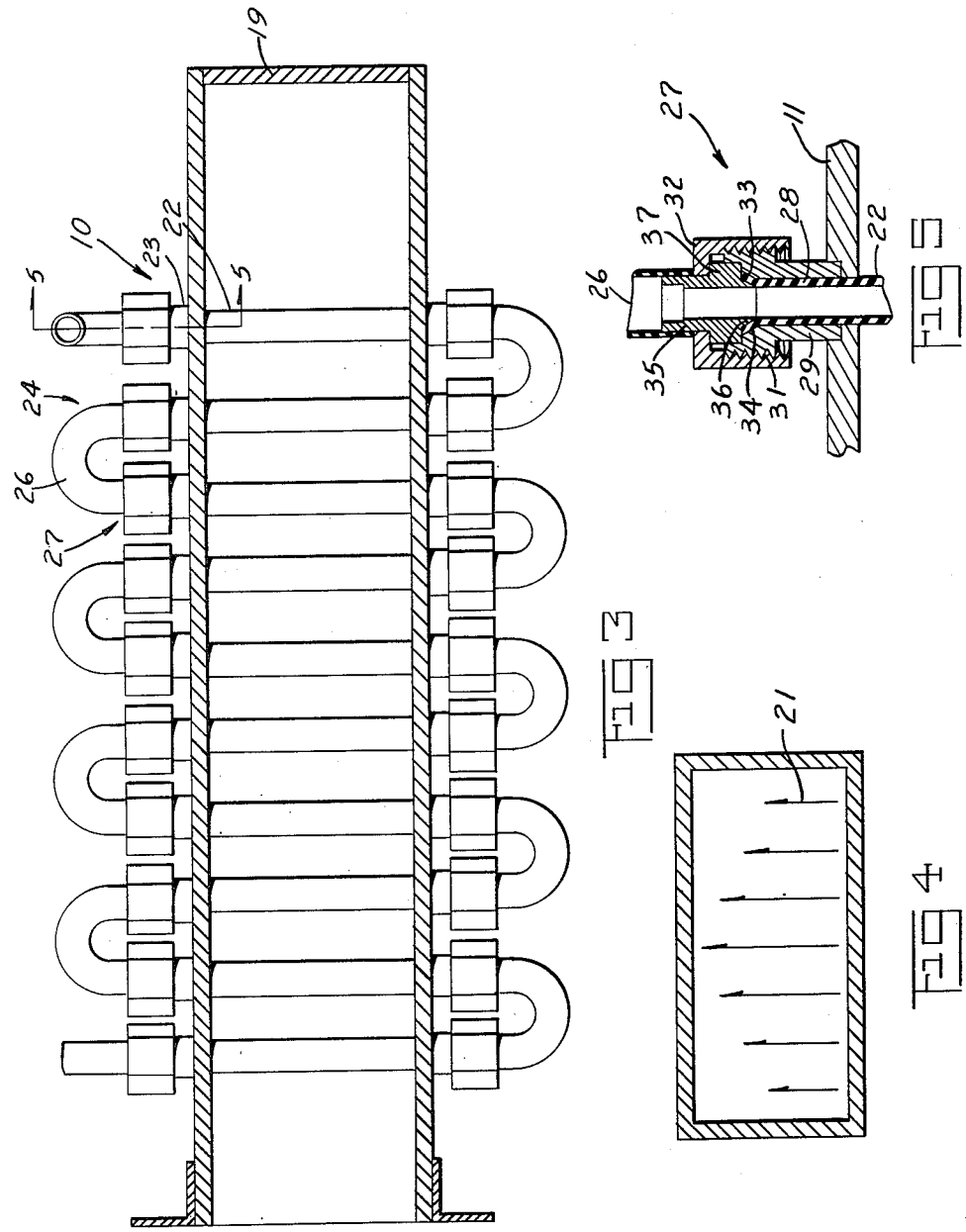

2,669,696

UNITED STATES PATENT OFFICE 2,669,696

HIGH POWERED WAVE GUIDE LOAD

Curtis E. Ward, Cedar Rapids, Iowa, assignor to Collins Radio Company, Cedar Rapids, Iowa, a corporation of Iowa Application December 10, 1949, Serial No. 132,286

3 Claims. (Cl. 333—22)

This invention relates in general to a means for terminating wave guides and in particular to a water cooled high powered wave guide load.

Different methods have heretofore been used for dissipating the power in a wave guide. One method has been to seal the end of the wave guide, tilt it downwardly and then partially fill it with water so that the energy traveling down the wave guide will be absorbed in the water. An objection to this method of termination is that at high power the water is heated to the boiling point. Thus the liquid is agitated and the resulting turbulence causes reflection of a portion of the impending energy.

It is an object of this invention therefore to provide a wave guide load which is water cooled and which substantially absorbs all of the energy received.

Another object of this invention is to provide a plurality of energy receiving tubes filled with circulating liquid for absorbing energy traveling down a wave guide.

Yet another object of this invention is to provide a tube coupling joint which prevents radiation.

Still another object is to provide a wave guide load having a plurality of tubes passing therethrough and spaced so that each tube absorbs the same amount of energy.

Further objects, features and advantages will become apparent from the following specifications and drawings, in which:

Figure 1 is an isometric drawing of the wave guide of this invention;

Figure 2 is a top plan view of the wave guide load illustrated in Figure 1;

Figure 3 is a sectional view taken along the line 3—3 of Figure 2;

Figure 4 is an end view of the wave guide illustrating how the voltage vectors are distributed across the area of the wave guide; and Figure 5 is a detailed sectional view of the water tubing joints taken on a line 5—5 in Figure 3.

Referring to Figure 1, a wave guide portion designated generally as 10 comprises the top wall 11, bottom wall 12 and side walls 13 and 14 respectively. A flange 16 fits about the end 17 of the wave guide and facilitates the connection of the wave guide load to the wave guide which is to be terminated. The wave guide to be terminated, not shown, is also provided with a cooperating flange which is received in mating engagement against the flange 16 and secured thereto by bolts which pass through holes 18 formed in the flange 16. It is to be understood, however, that any suitable clamping or joining means may be used for securing the wave guide load 10 to the energy furnishing wave guide.

As shown in Figure 3 the end of the wave guide load 10 is closed by an end plate 19. When energy is propagated down a wave guide the distribution of the voltage vectors is proportional to the sine. This is illustrated in Figure 4 wherein the voltage vectors are designated by numeral 21. Power is proportional to the voltage squared and thus the power distribution over the cross-sectional area of the wave guide will be proportional to the sine squared. Thus if it is desired to pass a plurality of tubes transversely through the wave guide and to dissipate the impending energy therein, the tubes must be so spaced so that the center tubes will not receive more energy than the tubes closely adjacent to the side walls of the wave guide. Stated otherwise, it is generally advantageous when absorbing energy in a plurality of water filled tubes to have the amount absorbed in each tube be substantially equal. Under these conditions maximum energy will be dissipated in the fixed number of tubes for the reason that no tubes will become overheated prior to the overheating of all of the tubes.

A plurality of tubes 22 pass through the wave guide load 10. The tubes 22 may be formed from polystyrene, for example.

The ends 23 of the tubes are connected together by the coupling members 24 which comprise a U-shaped tube 26 having coupling joints 27 at either end thereof.

Referring to Figure 5 the coupling joint 27 is seen to comprise an end portion 28 of the tubes 22 which are surrounded concentrically by sleeve 29. The lower end of the sleeve is connected to the wall 11 of the wave guide. Adjacent the upper end of the sleeve 29 is an enlarged threaded portion 31 which is adapted for threadedly receiving a collar 32. The end of the tube 28 is flared. This flared portion 33 is engaged by a shoulder 34 formed on the inner surface of the sleeve 29. An adapter 35 is formed with a tapered portion 36 which is received in mating engagement by flared portion of the tube 28. The adapter 35 is formed with a shoulder 37 which is engaged by the collar 32. The tube 26 fits on a necked down portion of the adapter 35 externally of the collar 32. It is to be noted that any energy traveling from the internal portion of the wave guide through the tube 22 and the end portion 28 will not be radiated from the tube 26 because of the structure of the coupling 27. The flared ends 36 of the tube 28 are entirely surrounded by material and any energy radiated therefrom will be dissipated in the collar 32 of the adapter 34. Referring to Figure 1 at least one of the tubes 26 is used as an inlet pipe to the energy dissipating system. An energy absorbing fluid, for example, water, is passed through the inlet tube 38 to the tube 22. At the opposite end of the wave guide the fluid emerges and the coupling 24 passes it to the next tube 22. Thus the water travels back and forth through a plurality of tubes until it is discharged through the tube 39. Thus a supply line furnishing cool liquid to the system is connected to the inlet tube 38 and a discharge line removing the warmer liquid is connected to the discharge line 39. Temperature measuring means may be provided in the inlet line and the discharge line to obtain the temperature gradient of the water as it passes through the wave guide load. It is to be understood of course that the tubes need not be all series connected. For example, all the tubes at the top side 11 of the wave guide may be connected in parallel and the supply line connected to the manifold. A second manifold may connect the ends of the tubes on the opposite side of the wave guide and a discharge pipe may remove the liquid from a discharge manifold. Similarly any number of series-parallel connections may be used for supplying and removing the water from the tube.

As is best illustrated in Figure 2 the tubes are spaced on the top wall 11 so that each tube will absorb approximately the same amount of energy. Energy enters the wave guide load through the flange 16 and impinges on the first tubes 41 which are spaced closely adjacent to the side walls of the wave guide. The particular wave guide load illustrated in Figure 2 has twenty tubes passing therethrough and thus the first pair of tubes 41 are spaced so as to absorb $\frac{1}{10}$ the total energy received by the wave guide load. Since the distribution of the energy is proportional to the sine squared the spacing of the tubes may be computed mathematically. Referring to Figure 4 the cross sectional area may be given the coordinates $x$ and $y$ with the longer axis being $x$ and the short axis $y$. The power distribution will be defined by the equation:

(1) $\text{Power} = k \sin^2 x$

In order to obtain the total power transmitted by the guide, this equation must be integrated between the limits of zero to $\pi$. The total power is thus:

(2) $$\text{Total power} = k\int_0^\pi y\,dx = k\int_0^\pi \sin^2 \times dx = k\frac{\pi}{2}$$

Since it is desired to place the first tubes 41 in a position so that they will absorb approximately $\frac{1}{20}$ of the total energy we may solve for a value of $x$ which will contain $\frac{1}{20}$ of the total area under the power curve. A solution of this problem gives about $36\frac{1}{2}$ degrees so the $x$ of the first tubes 41 from the outer edge of the wave guide would be approximately 36 electrical degrees. In a mathematical or graphical manner the spacings of the remaining tubes may be obtained. The second pair of tubes 42 are to be spaced so as to absorb $\frac{1}{10}$ of the energy entering the wave guide and since $\frac{1}{10}$ of the energy has been withdrawn by the tubes 41, the tubes 42 must withdraw $\frac{1}{9}$ of the energy reaching them. Similarly the third pair of tubes 43 must absorb $\frac{1}{8}$ of the energy reaching them and so on until the final tubes 44 absorb 100% of the energy reaching them. Since the maximum energy travels down the center of the wave guide the tubes 44 are located in the center and withdraw all the remaining energy in the attenuated wave.

Since the spacing of the tubes has been such that each tube receives the same amount of energy, heating of the liquid passing through the tubes will be uniform and there will be no excessive heating in any of them. Thus maximum energy dissipation may be obtained.

Although this invention has been described with respect to preferred embodiments thereof it is not to be so limited since changes and modifications may be made which are within the full intended scope as defined by the following claims.

I claim:

1. A load for absorbing high power energy in a wave guide comprising, a closed end rectangular wave guide section receiving energy into the open end, a plurality of conduits passing transversely through the wave guide section and offset longitudinally from each other so that the pattern formed by the intersection of the conduits with the wave guide wall is a parabola, and with the conduits adjacent the edges of the wave guide being further from the closed end than the center conduits, and energy absorbing fluid passing through said conduits to absorb the energy passing down the wave guide.

2. A load for absorbing high energy power in a wave guide comprising, a closed end rectangular-shaped wave guide section receiving energy into the open end thereof, a plurality of conduits passing transversely through the wave guide across the shortest dimension, said conduits mounted in the wave guide with the conduits adjacent the edges of the wave guide being displaced farther from the closed end than the center conduits and the pattern formed by the intersection of the conduits with the wave guide wall having the shape of a parabola.

3. Apparatus according to claim 2 wherein said conduits are spaced increasingly closer together from the outer edge to the center of the wave guide.

CURTIS E. WARD.

References Cited in the file of this patent

UNITED STATES PATENTS

| Number | Name | Date |
|---|---|---|
| 541,736 | Friede | June 25, 1895 |
| 2,290,890 | Parker | July 28, 1942 |
| 2,400,777 | Okress | May 21, 1946 |
| 2,427,094 | Evans | Sept. 9, 1947 |
| 2,479,483 | Ekleberry | Aug. 16, 1949 |
| 2,497,093 | Moreno | Feb. 14, 1950 |
| 2,556,642 | Bird | June 12, 1951 |

OTHER REFERENCES

Very High Frequency Techniques, volume II, 1st Edition, Radio Research Laboratory Staff, Pub. by McGraw-Hill in 1947 (use pages 588–590 incl.). Copy in Div. 69.